(12) United States Patent
Nozaki et al.

(10) Patent No.: US 7,524,267 B2
(45) Date of Patent: Apr. 28, 2009

(54) CONTROL APPARATUS FOR VEHICULAR AUTOMATIC TRANSMISSION

(75) Inventors: Kazutoshi Nozaki, Aichi-gun (JP); Atsushi Honda, Seto (JP); Akiharu Abe, Toyota (JP); Hirofumi Ota, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 358 days.

(21) Appl. No.: 11/480,933

(22) Filed: Jul. 6, 2006

(65) Prior Publication Data

US 2007/0026998 A1    Feb. 1, 2007

(30) Foreign Application Priority Data

Aug. 1, 2005    (JP)    ............................. 2005-223350

(51) Int. Cl.
*F16H 61/26*    (2006.01)
*F16H 61/18*    (2006.01)
*F16H 61/04*    (2006.01)
*F16H 31/00*    (2006.01)

(52) U.S. Cl. ..................... 477/130; 477/125; 477/143; 475/128

(58) Field of Classification Search ................. 477/125, 477/127, 128, 129, 130, 131, 134, 143, 147, 477/906; 475/127, 128, 99, 119
See application file for complete search history.

(56) References Cited

U.S. PATENT DOCUMENTS

| | | | | |
|---|---|---|---|---|
| 5,597,372 A | * | 1/1997 | Jang | ........................... 477/143 |
| 5,921,885 A | * | 7/1999 | Tabata et al. | ................. 477/107 |
| 6,464,610 B1 | * | 10/2002 | Hisano et al. | ................ 475/119 |
| 6,907,970 B2 | * | 6/2005 | Sugimura | ................... 188/382 |
| 6,966,862 B2 | * | 11/2005 | Inuta | ........................... 475/119 |
| 7,320,657 B2 | * | 1/2008 | Nozaki et al. | ................ 475/119 |

FOREIGN PATENT DOCUMENTS

| | | |
|---|---|---|
| JP | 2000-35113 | 2/2000 |
| JP | 2000-65203 | 3/2000 |
| JP | 2005-163916 | 6/2005 |
| JP | 2006-46542 | 2/2006 |
| KR | 10-2002-0018748 | 3/2002 |
| KR | 10-2006-0050280 | 5/2006 |

* cited by examiner

*Primary Examiner*—Roger Pang
(74) *Attorney, Agent, or Firm*—Oblon, Spivak, McClelland, Maier & Neustadt, P.C.

(57) ABSTRACT

In a hydraulic control apparatus for a vehicular automatic transmission, if it is determined that there is a failure that may cause tie-up in an automatic transmission, communication is provided between a first output port and a first drain port in a switching valve. As a result, a hydraulic frictional engagement device, which should be disengaged when there is a failure, is disengaged. Also, a specific shift speed is achieved by controlling the switching valve. Therefore, it is not necessary to select a shift speed that is achieved on the condition that the hydraulic frictional engagement device, which should be disengaged when there is a failure, is engaged. Thus, it is possible to prevent a shift that may impair driveability when there is a failure that may cause tie-up in the automatic transmission.

7 Claims, 9 Drawing Sheets

FIG. 2

|  | C1 | C2 | C3 | C4 | B1 | B2 | F1 |
|---|---|---|---|---|---|---|---|
| P |  |  |  |  |  |  |  |
| Rev1 |  |  | O |  |  | O |  |
| Rev2 |  |  |  | O |  | O |  |
| N |  |  |  |  |  |  |  |
| 1st | O |  |  |  |  | (O) | O |
| 2nd | O |  |  |  | O |  |  |
| 3rd | O |  | O |  |  |  |  |
| 4th | O |  |  | O |  |  |  |
| 5th | O | O |  |  |  |  |  |
| 6th |  | O |  | O |  |  |  |
| 7th |  | O | O |  |  |  |  |
| 8th |  | O |  |  | O |  |  |

CONTROL APPARATUS FOR VEHICULAR AUTOMATIC TRANSMISSION

INCORPORATION BY REFERENCE

The disclosure of Japanese Patent Application No. 2005-223350 filed on Aug. 1, 2005, including the specification, drawings and abstract is incorporated herein by reference in its entirety.

BACKGROUND OF THE INVENTION

1. Field of the Invention

The invention relates to a hydraulic control apparatus for a vehicular automatic transmission in which hydraulic frictional engagement devices are engaged by controlling solenoid valves that output hydraulic pressure directly to the hydraulic frictional engagement devices. More particularly, the invention relates to a technology in which when there is a failure that may cause tie-up in an automatic transmission, a specific shift speed is achieved to prevent tie-up.

2. Description of the Related Art

Japanese Patent Application Publication No. JP-A-2000-65203 describes an example of a hydraulic control apparatus for a vehicular automatic transmission. In the automatic transmission, a plurality of shift speeds having different speed ratios are achieved by selectively engaging and disengaging a plurality of hydraulic frictional engagement devices. The hydraulic control apparatus includes a plurality of solenoid valves that correspond to the respective hydraulic frictional engagement devices, and output hydraulic pressure directly to the respective hydraulic frictional engagement devices. The hydraulic control apparatus achieves the plurality of shift speeds by controlling the plurality of solenoid valves.

In this hydraulic control apparatus, if a given solenoid valve remains in the position to output the hydraulic pressure (i.e., a given solenoid valve continues to output the hydraulic pressure) due to a failure, the hydraulic frictional engagement device corresponding to the failed solenoid valve is constantly maintained in the engaged state by the hydraulic pressure output from the failed solenoid valve. In this case, at least one hydraulic frictional engagement device may be engaged in addition to predetermined frictional engagement devices that are engaged to achieve a current shift speed, and the gear mechanisms of the automatic transmission may be locked. That is, so-called tie-up may occur in the automatic transmission. To prevent this tie-up, the shift speed is changed to another shift speed that is achieved on the condition that the hydraulic frictional engagement device corresponding to the failed solenoid valve is engaged.

That is, in the conventional apparatus, tie-up is prevented by changing the shift speed to another shift speed that is achieved on the condition that the hydraulic frictional engagement device corresponding to the failed solenoid valve is engaged by the hydraulic pressure output from the failed solenoid valve. However, if the shift speed is changed to another shift speed that is achieved on the condition that the hydraulic frictional engagement device corresponding to the failed solenoid valve is engaged, a shift that may impair driveability may be executed, for example, a drastic downshift from the eighth speed to the fifth speed may be executed. This may make the driver feel uncomfortable.

SUMMARY OF THE INVENTION

In view of the above, the invention provides a hydraulic control apparatus for a vehicular automatic transmission, which prevents a shift that may impair driveability when there is a failure that may cause tie-up.

An aspect of the invention relates to a hydraulic control apparatus for a vehicular automatic transmission in which a plurality of shift speeds having different speed ratios are achieved by selectively engaging and disengaging a plurality of hydraulic frictional engagement devices. The hydraulic control apparatus includes a plurality of solenoid valves; and a switching valve device. The plurality of solenoid valves correspond to the respective hydraulic frictional engagement devices. The plurality of solenoid valves output hydraulic pressure directly to the respective hydraulic frictional engagement devices. The plurality of solenoid valves are controlled to achieve any one of a plurality of shift speeds. The switching valve device includes a first output port, a first input port, and a first drain port. The first output port is connected to an input port of a solenoid valve among the plurality of solenoid valves, which corresponds to a hydraulic frictional engagement device among the plurality of hydraulic frictional engagement devices, which is disengaged when there is a failure that may cause tie-up in the automatic transmission. An original pressure is supplied to the first input port. When there is no failure, communication is provided between the first output port and the first input port. When there is a failure that may cause tie-up, communication is provided between the first output port and the first drain port to achieve a specific shift speed.

With this configuration, when there is a failure that may cause tie-up in the automatic transmission, communication is provided between the first output port and the first drain port in the switching valve device. As a result, the hydraulic frictional engagement device among the plurality of hydraulic frictional engagement devices, which should be disengaged when there is a failure that may cause tie-up, is disengaged. Also, the specific shift speed is achieved by controlling the switching valve device. Therefore, it is not necessary to select a shift speed that is achieved on the condition that the hydraulic frictional engagement device corresponding to the failed solenoid valve is engaged. Thus, when there is a failure that may cause tie-up in the automatic transmission, it is possible to prevent a shift that may impair driveability.

As the automatic transmission, a planetary gear type automatic transmission, which includes a plurality of planetary gear units provided on one axis, is appropriately employed. However, it is possible to employ an automatic transmission in which a plurality of planetary gear units are provided on a plurality of axes that are provided in parallel with each other. It is also possible to employ a planetary gear type automatic transmission in which a plurality of input passages are provided. That is, it is possible to employ various automatic transmissions in which a plurality of hydraulic frictional engagement devices are selectively engaged and disengaged to perform shift operation.

As the hydraulic frictional engagement device, a multiple disc clutch, a multiple disc brake, a single disc clutch, a single disc brake, and a belt brake are widely used. The oil pump that supplies the pressure of hydraulic oil to engage the hydraulic frictional engagement device may be driven to discharge the hydraulic oil by a power source for driving the vehicle, such as an engine. Alternatively, the oil pump may be driven by, for example, an electric motor dedicated to drive the oil pump, which is provided separately from the power source for driving the vehicle.

The solenoid valve is used only for performing the shift operation. As the solenoid valve, for example, a linear solenoid valve is appropriately employed. In the linear solenoid valve, a feedback oil chamber and a spring are provided on one side of a spool, and a solenoid is provided on the other side of the spool. The hydraulic pressure that is output is fed back to the feedback oil chamber. The linear solenoid valve outputs the hydraulic pressure according to balance between the force of the spring and the hydraulic pressure, and the electromagnetic force of the solenoid. It is also possible to employ an ON-OFF solenoid valve that controls the hydraulic pressure using duty control.

In the solenoid valve, the spool may be directly driven by a thrust output from a solenoid (electromagnetic actuator) that is operated according to an electric signal. The solenoid valve may include an electromagnetic valve and a spool valve. In this case, the electromagnetic valve includes a solenoid that is operated according to an electric signal, and the spool valve is driven according to a pilot pressure output from the electromagnetic valve.

Each of the plurality of solenoid valves corresponds to each of the plurality of hydraulic frictional engagement devices. However, in the case where a plurality of hydraulic frictional engagement devices are engaged or disengaged at the same time, one solenoid valve may be commonly used for the plurality of hydraulic frictional engagement devices. Thus, the invention can be realized in various embodiments.

The switching valve device may include a switching valve that includes a single spool. The switching valve may provide communication between the first output port and the first input port, and between the second output port and the second drain port when there is no failure, and may provide communication between the first output port and the first drain port, and between the second output port and the second input port.

A spring may constantly apply a force to the spool toward a non-failure position. When there is a failure, an electromagnetic valve may be operated to output a pilot pressure so that the pilot pressure is applied to one end surface of the spool. As a result, the spool is moved from the non-failure position to a failure position against the force of the spring. That is, the switching valve device may include the electromagnetic valve that moves the spool from the non-failure position to the failure position. Instead of providing the spring, an oil chamber may be provided. In this case, the oil chamber receives a given hydraulic pressure and applies the hydraulic pressure to the other end surface of the spool toward the non-failure position when there is no failure.

A modulator valve that generates a modulator pressure may be provided. In this case, the modulator pressure is supplied to the electromagnetic valve as an original pressure. For example, the modulator valve includes an input port, an output port, a drain port, a feedback oil chamber, and a pressure-regulation spring. A predetermined hydraulic pressure, such as a line pressure, is supplied to the input port. The output port is connected to the electromagnetic valve. Hydraulic oil is drained from the drain port. The hydraulic pressure output from the output port is fed back to the feedback oil chamber to apply a force to the spool in one direction. The pressure-regulation spring applies a force to the spool in the opposite direction. The modulator valve regulates an original pressure to a certain modulator pressure, according to balance between the force of the pressure-regulation spring and the output hydraulic pressure. It is also possible to employ a linear solenoid valve that electrically regulates the original pressure to a certain modulator pressure. The modulator pressure is a certain pressure that is lower than the line pressure.

The control device may be, for example, an electronic control unit that is composed of a microcomputer. The control device may include a determination device that determines whether there is a failure that may cause tie-up in the automatic transmission. The determination device determines whether there is a failure that may cause tie-up in the automatic transmission, based on the engagement state of the hydraulic frictional engagement device that is not used to achieve a shift speed that is selected when the vehicle is running, and the engagement state of the hydraulic frictional engagement device that is used to achieve the selected shift speed. For example, the determination device may determine whether there is a failure that may cause tie-up in the automatic transmission, based on, for example, a rapid change in the rotational speed of the input shaft of the automatic transmission (engine rotational speed) or the rotational speed of the output shaft of the automatic transmission during shift operation, or a change in a rotational acceleration or a vehicle body acceleration during the shifting operation. For example, the engagement state of the hydraulic frictional engagement device is determined by detecting the engagement pressure for the hydraulic frictional engagement device using a hydraulic pressure sensor or a hydraulic pressure switch connected to the hydraulic frictional engagement device. The engagement state of the hydraulic frictional engagement device may be determined by detecting an electromotive force generated in the solenoid corresponding to the hydraulic frictional engagement device. The hydraulic pressure sensor or the hydraulic pressure switch does not need to be provided in each of all the hydraulic frictional engagement devices. The hydraulic pressure sensor or the hydraulic pressure switch may be provided in each hydraulic frictional engagement device whose engagement state should be detected to determine whether there is a failure that may cause tie-up.

The electronic control unit may include a specific shift-speed fixing device that fixes the shift speed of the automatic transmission to a specific shift speed that is lower than the highest shift speed of the automatic transmission by one speed level, by switching the state of the switching valve device from the non-failure state to the failure state, when the determination device determines that there is a failure that may cause tie-up in the automatic transmission.

The specific shift speed is lower than the highest shift speed of the automatic transmission by one speed level. However, the specific shift speed may be lower than the highest shift speed of the automatic transmission by two speed levels. The specific shift speed may be lower than the highest shift speed by three speed levels if no problem regarding the movement of the vehicle occurs due to the downshift when there is a failure. For example, in the case where the automatic transmission has eight forward speeds, the specific shift speed may be the seventh speed, the sixth speed, or the fifth speed.

The invention is not limited to the case where only one switching valve device is provided, and only one specific shift speed is provided. By increasing the number of the switching valve devices, two specific shift speeds (for example, the third speed and the seventh speed) or three specific shift speeds (for example, the first speed, the third speed, and the seventh speed) can be provided. For example, in the case where two specific shift speeds are provided, a first specific shift speed may be achieved by a first switching valve device, and a second specific shift speed may be achieved by a second switching valve device. In this case, if it is determined that there is a failure at a low shift speed lower than or equal to a predetermines shift speed, the state of the first switching valve device is switched to achieve the first specific shift speed lower than or equal to the predetermined shift speed. If it is determined that there is a failure at a high shift speed higher than the predetermined shift speed, the state of the second switching valve device is switched to achieve the second specific shift speed higher than the predetermined shift speed.

The switching valve device may be a switching valve whose state is switched by a pilot pressure output from an electromagnetic valve. The switching valve device may be a switching valve in which a spool is directly driven by the thrust of an electromagnetic solenoid. The switching valve device may be a switching valve that has the aforementioned function, and includes two spools. In this case, one spool provides communication between the first output port and the first input port or the first drain port. The other spool provides communication between the second output port and the second input port or the second drain port. That is, the switching valve may have various mechanical configurations as long as the switching valve has the aforementioned function.

BRIEF DESCRIPTION OF THE DRAWINGS

The features, advantages thereof, and technical and industrial significance of this invention will be better understood by reading the following detailed description of example embodiments of the invention, when considered in connection with the accompanying drawings, in which:

FIG. 2 is a table showing the operating states of engagement elements of the vehicular automatic transmission in FIG. 1;

DETAILED DESCRIPTION OF THE EXAMPLE EMBODIMENTS

In the following description and the accompanying drawings, the present invention will be described in more detail with reference to example embodiments.

Figure 1:
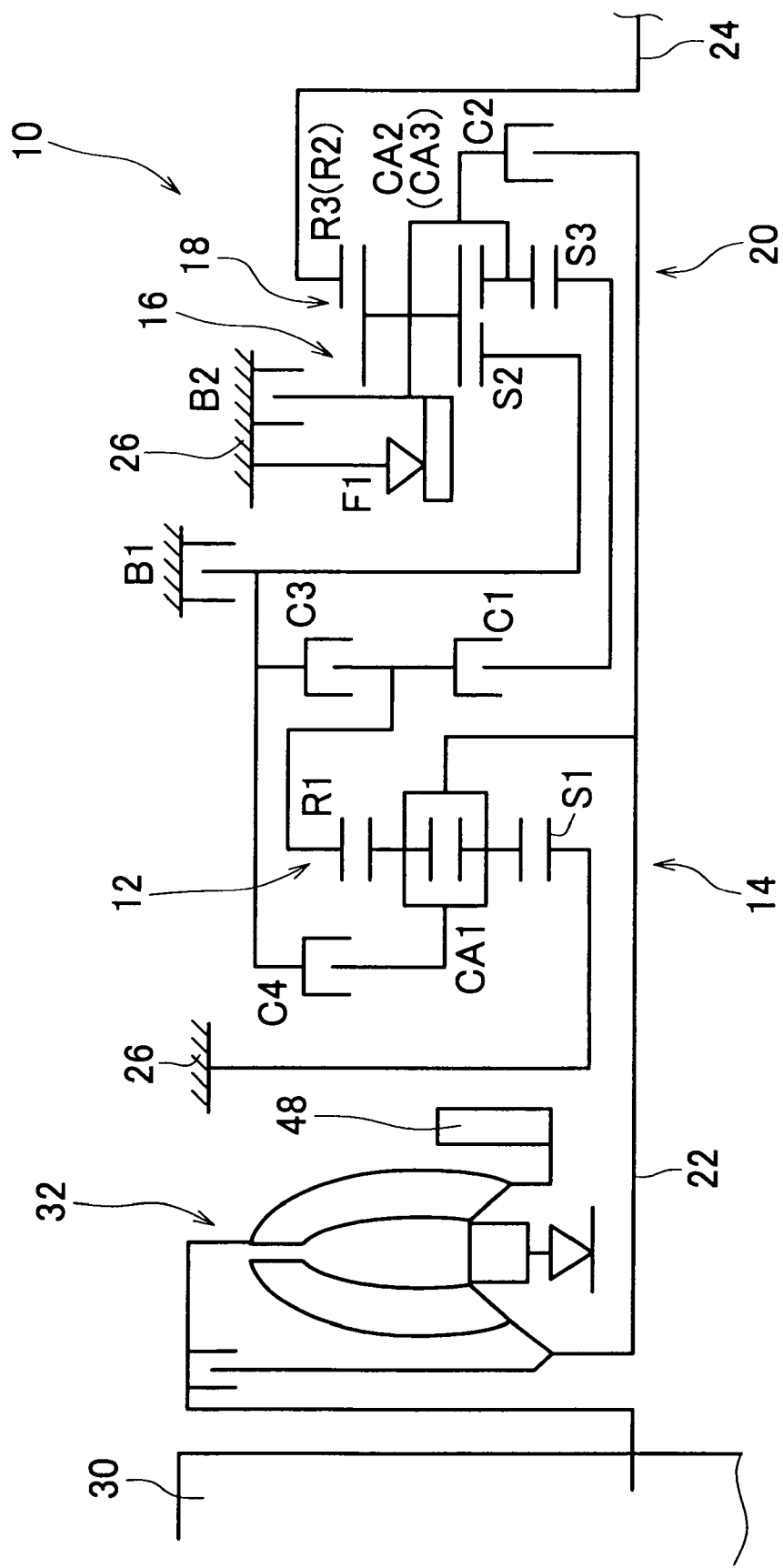
FIG. 1 is a diagram showing the configuration of a vehicular automatic transmission to which the invention is applied.

FIG. 1 is a schematic diagram showing a vehicular automatic transmission 10. FIG. 2 is a table explaining the operating states of engagement elements in the automatic transmission 10 at each of a plurality of shift speeds. The automatic transmission 10 is appropriately disposed in the longitudinal direction of a front-engine rear-drive vehicle. The automatic transmission 10 includes a first shifting portion 14 and a second shifting portion 20 that are disposed on one axis. The first shifting portion 14 includes a first planetary gear unit 12 of a double pinion type. The second shifting portion 20 includes a second planetary gear unit 16 of a single pinion type and a third planetary gear unit 18 of a double pinion type. The rotational speed of an input shaft 22 is changed, and the changed rotational speed is output through an output shaft 24. The input shaft 22 is equivalent to an input member. In this embodiment, the input shaft 22 is the turbine shaft of a torque converter 32 driven by an engine 30 that is a power source for driving a vehicle. The output shaft 24 is equivalent to an output member. The output shaft 24 drives left and right driving wheels via a propeller shaft and a differential gear device. Because the automatic transmission 10 is substantially symmetric with respect to a center line, only the upper half parts of the automatic transmission 10 are shown in FIG. 1. In FIG. 1, a transmission case is denoted by a reference numeral 26.

In the automatic transmission 10, any one of a first speed "$1^{st}$" to an eighth speed "$8^{th}$", and a first reverse speed and second reverse speed can be achieved by connecting some of rotational elements of the first shifting portion 14 and the second shifting portion 20 (i.e., the sun gears S1 to S3, the carriers CA1 to CA3, the ring gears R1 to R3), as shown in FIG. 1 and FIG. 2.

FIG. 2 is a table showing the operating states of clutches C1 to C4, and brakes B1 and B2 at each shift speed. A circle indicates that the clutch or the brake is engaged. A circle in parentheses indicates that the brake is engaged only when the engine brake is applied. Because a one-way clutch F1 is provided in parallel with the brake B2 used to achieve the first speed "$1^{st}$", the brake B2 does not necessarily need to be engaged when the vehicle starts moving (when the vehicle accelerates). The speed ratio at each shift speed is appropriately determined based on the gear ratio (i.e., the number of teeth of the sun gear/the number of teeth of the ring gear) $\rho 1$ of the first planetary gear unit 12, the gear ratio $\rho 2$ of the second planetary gear unit 16, and the gear ratio $\rho 3$ of the third planetary gear unit 18.

As shown in the table in FIG. 2, in the automatic transmission 10, any one of the plurality of forward shift speeds is achieved by engaging two hydraulic frictional engagement devices including at least one of clutches C1 and C2. The clutch C1 functions as the first hydraulic frictional engagement. The clutch C1 is engaged when the shift speed is lower than or equal to a predetermined shift speed (fifth speed in this embodiment), and is disengaged when the shift speed is higher than the predetermined shift speed. The clutch C2 functions as the second hydraulic frictional engagement device. The clutch C2 is disengaged when the shift speed is lower than the predetermined shift speed, and is engaged when the shift speed is higher than or equal to the predetermined shift speed.

The clutches C1 to C4 and the brakes B1 and B2 (hereinafter, referred simply as "clutch(es) C" and "brake(s) B", unless a specific clutch or a specific brake needs to be indicated) are hydraulic frictional engagement devices controlled by hydraulic actuators. For example, each clutch C is a multiple disc clutch, and each brake B is a multiple disc brake. By energizing or de-energizing linear solenoid valves SL1 to SL6 in a hydraulic control circuit 98 (refer to FIG. 3), or by controlling electric current, the appropriate clutch C and the brake B are engaged/disengaged, and the transient hydraulic pressure is controlled in the process of engaging/disengaging the clutch C and the brake B. FIG. 4 is a circuit diagram showing a portion of the hydraulic control circuit 98, which relates to the linear solenoid valves SL1 to SL6. Hydraulic actuators (hydraulic cylinders) $A_{C1}, A_{C2}, A_{C3}, A_{C4}, A_{B1}$, and $A_{B2}$ for the clutches C1 to C4 and the brakes B1 and B2 are directly connected to the linear solenoid valves SL1 to SL6, respectively. The linear solenoid valves SL1 to SL6 generate engagement pressure for the clutches C1 to C4 and brakes B1 and B2, respectively, by regulating a line pressure PL, which is an original pressure, according to instruction signals from an electronic control unit 90. Thus, the linear solenoid valves SL1 to SL6 directly supply the engagement pressure to the hydraulic actuators $A_{C1}, A_{C2}, A_{C3}, A_{C4}, A_{B1}$, and $A_{B2}$, respectively. A relief valve (not shown) generates the line pressure PL by regulating a pressure output from a mechanical oil pump or an electromagnetic oil pump, according to an engine load or the like. The mechanical oil pump or the electromagnetic oil pump is driven by the engine 30. The engine load is indicated by an accelerator-pedal operation amount or a throttle-valve operation amount.

Figure 5:
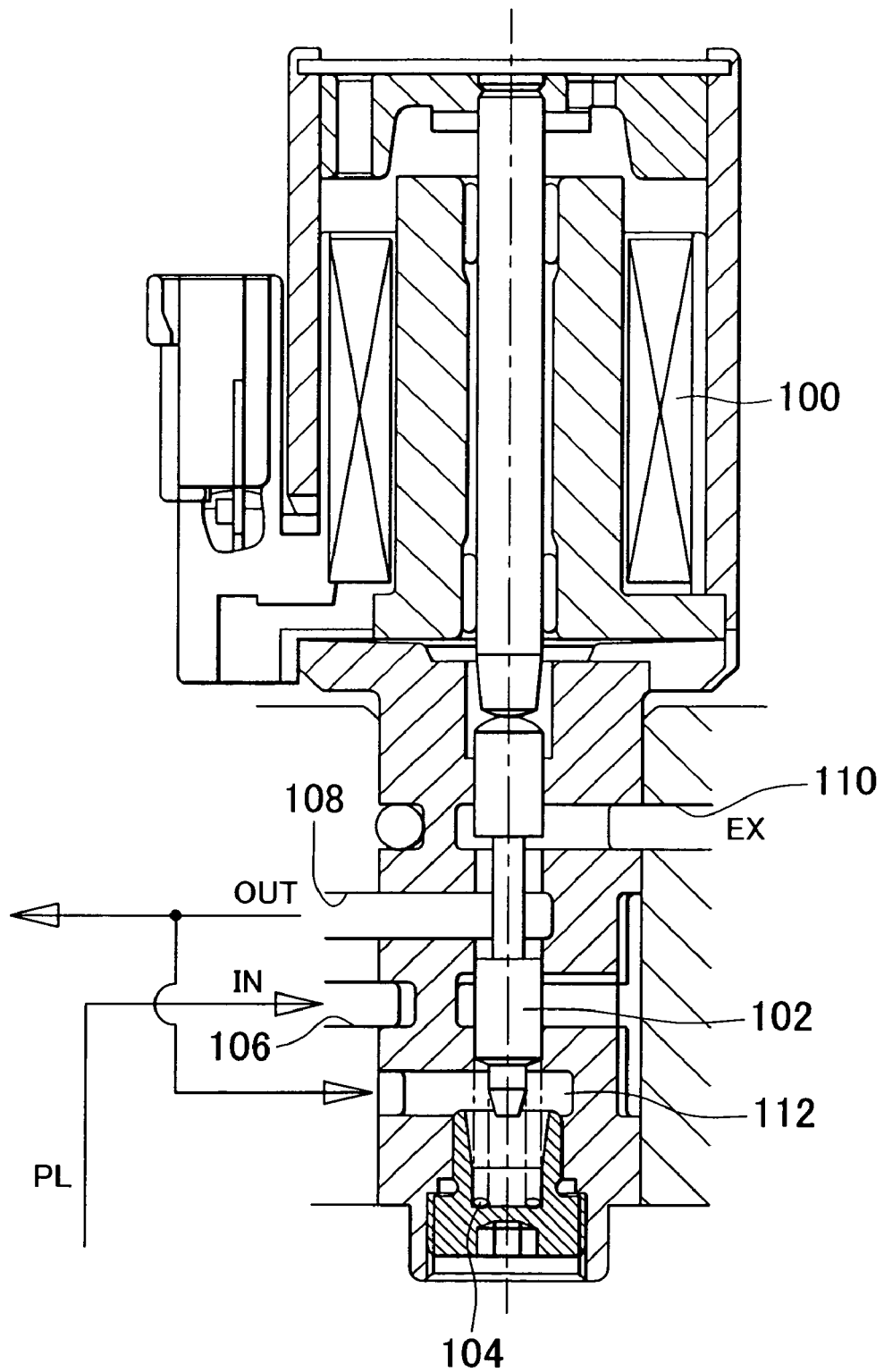
FIG. 5 is a cross sectional view of an example of a linear solenoid valve in FIG. 4.
Figure 6:
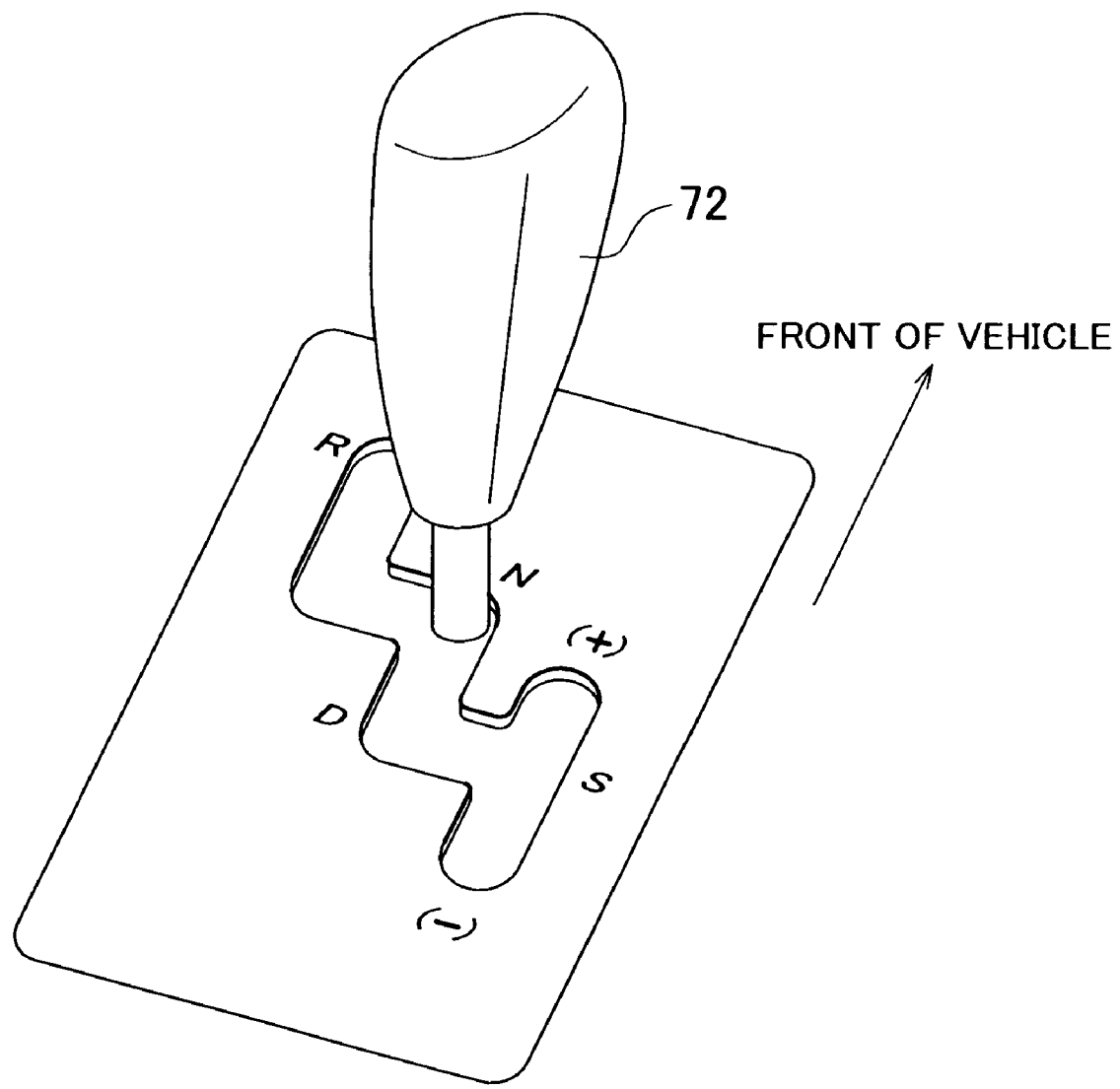
FIG. 6 is a perspective view of an example of a shift lever in FIG. 3.

The linear solenoid valves SL1 to SL6 are equivalent to the solenoid valve used for shift operation. Basically, the linear solenoid valves SL1 to SL6 have the same configuration. In this embodiment, the linear solenoid valves SL1 to SL6 are normally-closed valves. FIG. 5 shows an example of the solenoid valve. The solenoid valve in FIG. 5 includes a solenoid 100, a spool 102, a spring 104, an input port 106, an output port 108, a drain port 110, and a feedback oil chamber 112. The solenoid 100 generates an electromagnetic force in accordance with an exciting current. The line pressure PL is supplied to the input port 106. The regulated hydraulic pressure is output from the output port 108. The hydraulic pressure that is output is supplied to the feedback oil chamber 112. The solenoid 100 generates an electromagnetic force F to satisfy the following equation (1).

$$F = Pf \times Af + Fls \qquad (1)$$

In this equation (1), Pf represents a feedback hydraulic pressure supplied to the feedback oil chamber 112; Af represents the area that receives the feedback hydraulic pressure Pf; and Fls represents the load of the spring 104. The states of the three ports 106, 108, and 110 are changed according to the electromagnetic force F. As a result, the output hydraulic pressure (feedback hydraulic pressure Pf) is regulated. The hydraulic pressure output from the linear solenoid valves SL1 to SL6 is supplied to the hydraulic actuators $A_{C1}$, $A_{C2}$, $A_{C3}$, $A_{C4}$, $A_{B1}$, and $A_{B2}$, respectively. The electronic control unit 90 energizes the solenoid 100 of each of the linear solenoid valves SL1 to SL6, individually. Thus, the hydraulic pressure for each of the hydraulic actuators $A_{C1}$, $A_{C2}$, $A_{C3}$, $A_{C4}$, $A_{B1}$, and $A_{B2}$ is individually controlled.

Referring to FIG. 4 again, the input ports 106 of the solenoid valves SL1, SL4, and SL5 corresponding to the clutches C1 and C4 and the brake B1 are connected to a first output port 38c of a switching valve 36. The clutches C1 and C4 and the brake B1 are disengaged when there is a failure that may cause tie-up. As shown in FIG. 2, two hydraulic frictional engagement devices are engaged to achieve each shift speed. However, at least one hydraulic frictional engagement device may be engaged in addition to the two hydraulic frictional engagement devices, that is, three or more hydraulic frictional engagement devices may be engaged at the same time due to some kind of failure. In this case, the gear mechanisms in the automatic transmission 10 are locked. That is, so-called tie-up occurs in the automatic transmission 10. A switching valve device 35 includes a normally-closed electromagnetic valve MV1, and the switching valve 36. The state of the switching valve 36 is switched between a non-failure state and a failure state by a pilot pressure output from the electromagnetic valve MV1. If there is a failure that may cause tie-up, a specific shift speed (the seventh speed in this embodiment) is achieved using the switching valve device 35 to prevent tie-up. When achieving the seventh speed that is the specific shift speed if there is a failure, the clutches C1 and C4 and the brake B1 are disengaged. The input ports 106 of the solenoid valves SL1, SL4 and SL5 are connected to the first output port 38c of the switching valve 36. In addition, when achieving the seventh speed that is the specific shift speed, the clutches C2 and C3 are engaged. The drain ports 110 of the solenoid valves SL2 and SL3 corresponding to the clutches C2 and C3 are connected to the second output port 40c of the switching valve 36.

The electromagnetic valve MV1 is turned ON to output the pilot pressure that switches the state of the switching valve 36 from the non-failure state to the failure state. The pilot pressure is a modulator pressure PM. A modulator valve 46 generates the modulator pressure PM by regulating the line pressure PL, which is the original pressure, to a constant value. The modulator valve 46 includes an input port 46a, an output port 46c, a drain port 46b, a spool 46e, a spring 46d, and a feedback oil chamber 46f. The line pressure PL is supplied to the input port 46a. The output port 46c is connected to the electromagnetic valve MV1. Hydraulic oil is drained from the drain port 46b. The spool 46e provides communication between the output port 46c and the input port 46a or the drain port 46b. The spring 46d applies a force to the spool 46e in such a direction as to open the modulator valve 46. The feedback oil chamber 46f receives the modulator pressure PM, which is the output pressure, to apply a force to the spool 46e in such a direction as to close the modulator valve 46. The modulator valve 46 is a pressure-reducing valve, and regulates the line pressure PL, which is the original pressure, to a constant value based on the load of the spring 46d, regardless of a change in the line pressure PL.

As described above, the switching valve 36 includes the first output port 38c and the second output port 40c. The switching valve 36 further includes a first input port 38b, a first drain port 38a, a second input port 40a, and a second drain port 40b, and a spool 44. The line pressure PL, which is the original pressure, is supplied to the first input port 38b and the second input port 40a. When the switching valve 36 is in the non-failure state, the spool 44 is placed in a non-failure position by the force of the spring 42. When the switching valve 36 is in the failure state, the spool 44 is placed in a failure position against the force of the spring 42, by a thrust based on the pilot pressure.

When the spool 44 is in the non-failure position, the spool 44 provides communication between the first output port 38c and the first input port 38b, and between the second output port 40c and the second drain port 40b, as shown by solid lines in FIG. 4. When the spool 44 is in the failure position, the spool 44 provides communication between the first output port 38c and the first drain port 38a, and between the second output port 40c and the second input port 40a. The line pressure PL is supplied to the input ports 106 of the solenoid valves SL2, SL3, and SL6. Hydraulic switches $S_{C1}$, $S_{C2}$, $S_{C3}$, $S_{C4}$, $S_{B1}$, and $S_{B2}$ are connected to the hydraulic actuators $A_{C1}$, $A_{C2}$, $A_{C3}$, $A_{C4}$, $A_{B1}$, and $A_{B2}$, respectively. The hydraulic switches $S_{C1}$, $S_{C2}$, $S_{C3}$, $S_{C4}$, $S_{B1}$, and $S_{B2}$ detect the engagement pressure in the hydraulic actuators $A_{C1}$, $A_{C2}$, $A_{C3}$, $A_{C4}$, $A_{B1}$, and $A_{B2}$, respectively.

Figure 3:
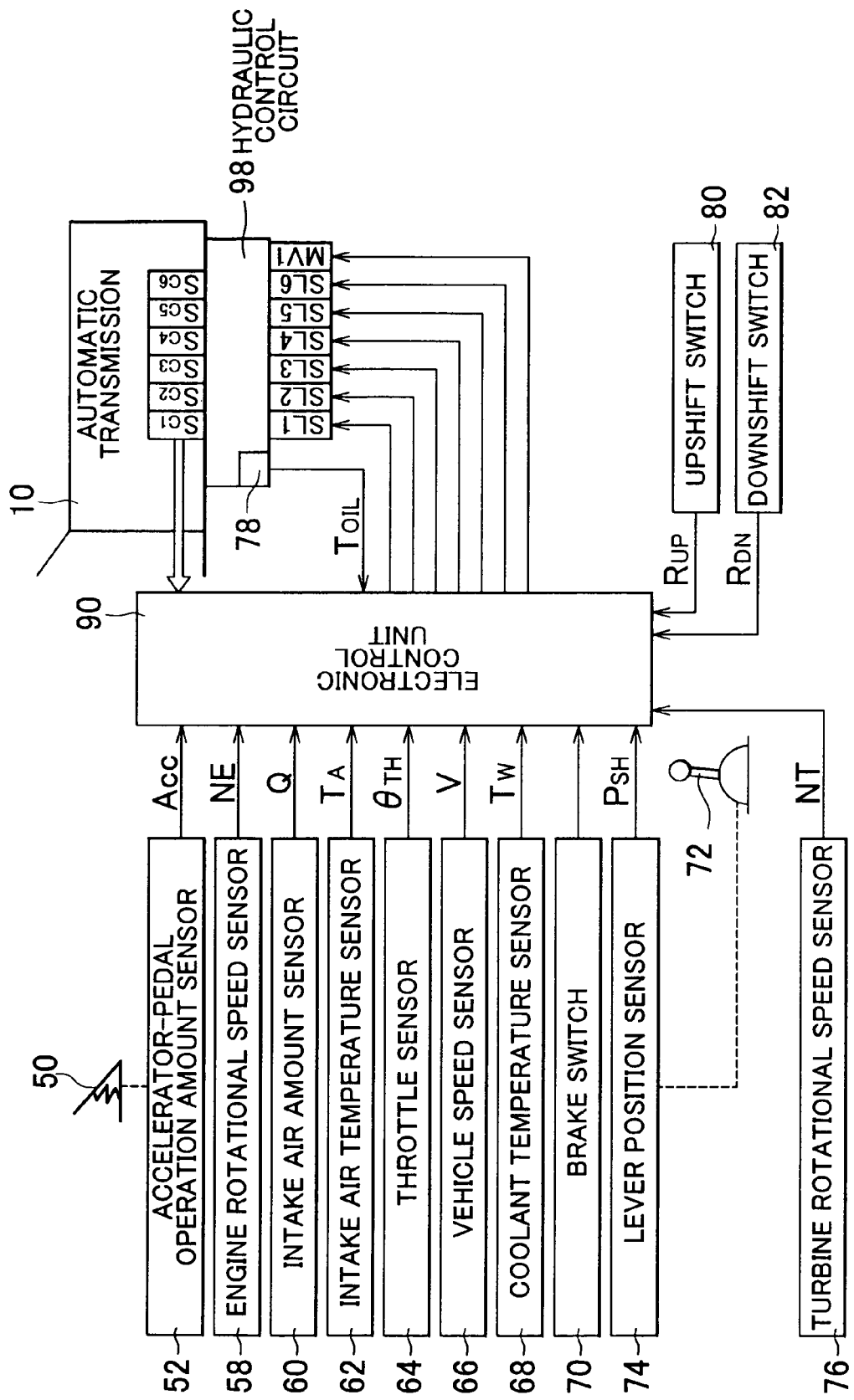
FIG. 3 is a block diagram showing the main portion of the control system of the vehicular automatic transmission in FIG. 1.
Figure 4:
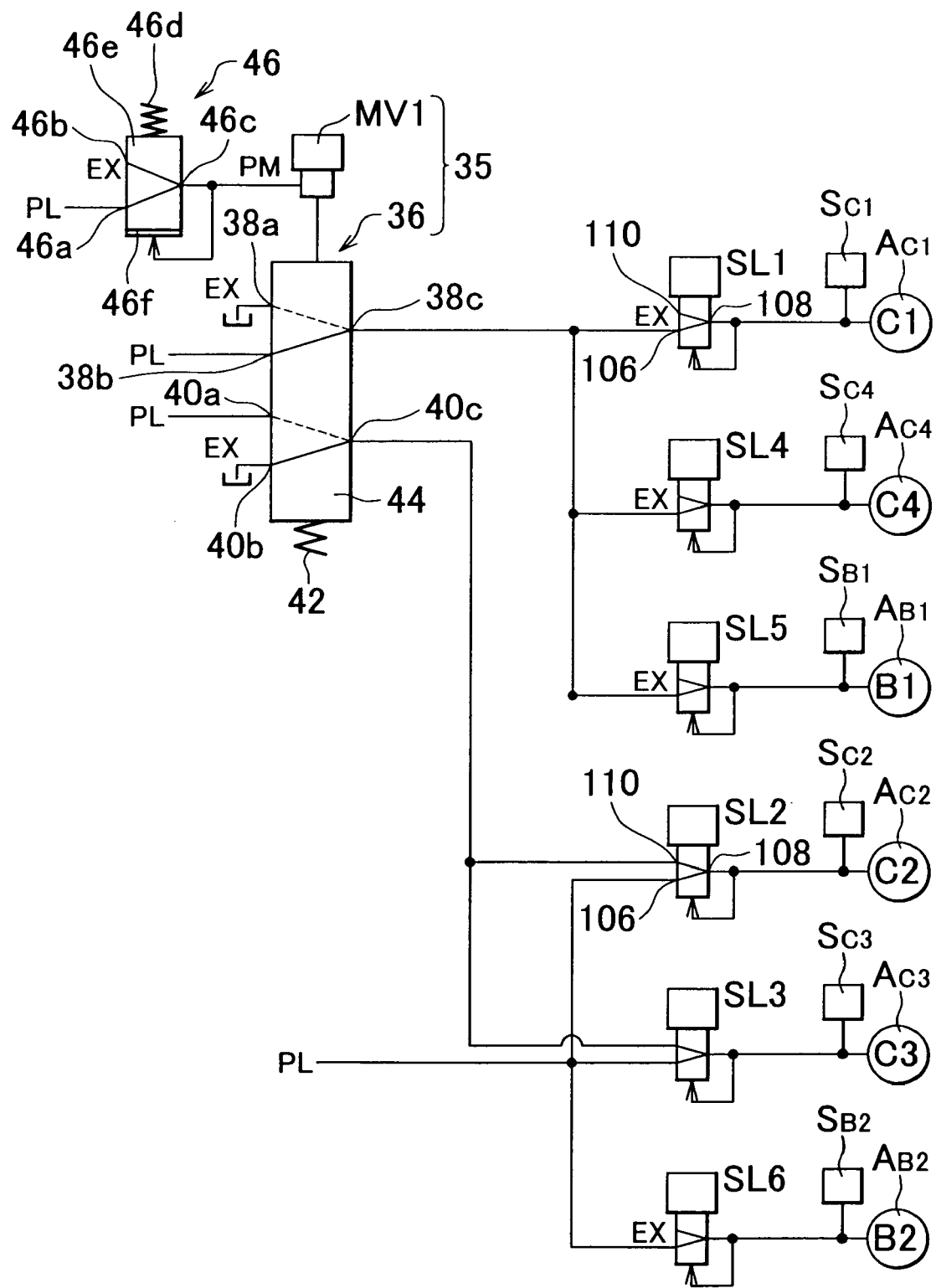
FIG. 4 is a circuit diagram showing the main portion of a hydraulic control circuit.

FIG. 3 is a block diagram showing an electric control system provided in the vehicle. The electric control system controls the automatic transmission 10 in FIG. 1 and the like. An accelerator-pedal operation amount sensor 52 detects the operation amount Acc of an accelerator pedal 50 (i.e., accelerator-pedal operation amount Acc). A signal indicating the accelerator-pedal operation amount Acc is supplied to the electronic control unit 90. The depression of the accelerator pedal 50 varies in accordance with the amount of output required by the driver. The accelerator pedal 50 is equivalent to an accelerator-pedal operating member. The accelerator-pedal operation amount Acc is equivalent to the required amount of output. Also, the control system includes an engine rotational speed sensor 58, an intake air amount sensor 60, an intake air temperature sensor 62, a throttle sensor 64 with an idle switch, a vehicle speed sensor 66, a coolant temperature sensor 68, a brake switch 70, a lever position sensor 74, a turbine rotational speed sensor 76, an AT oil temperature sensor 78, an upshift switch 80, a downshift switch 82, and the like. The engine rotational speed sensor 58 detects a rotational speed NE of the engine 30. The intake air amount sensor 60 detects an intake air amount Q of the engine 30. The intake air temperature sensor 62 detects a temperature $T_A$ of intake air. The throttle sensor 64 with the idle switch detects the fully-closed state of an electronic throttle valve of the engine 30 (i.e., the idling state of the engine 30), or an opening amount $\theta_{TH}$ of the electronic throttle valve. The vehicle speed sensor 66 detects a vehicle speed V (corresponding to a rotational speed $N_{OUT}$ of the output shaft 24). The coolant temperature sensor 68 detects a coolant temperature $T_W$ of the engine 30. The brake switch 70 detects whether a foot brake, which is a main brake, has been operated. The lever position sensor 74 detects the operation position $P_{SH}$ at which the shift lever 72 is placed. The turbine rotational speed sensor 76 detects a turbine rotational speed NT (i.e., a rotational speed $N_{IN}$ of the input shaft 22). The AT oil temperature sensor 78 detects an AT oil temperature $T_{OIL}$ that is the temperature of hydraulic oil in the hydraulic control circuit 98. The electronic control unit 90 receives signals indicating the engine rotational speed NE, the intake air amount Q, the intake air temperature $T_A$, the opening amount $\theta_{TH}$ of the throttle valve, the vehicle speed V, the engine coolant temperature $T_W$, the operation position $P_{SH}$ of the shift lever 72, the turbine rotational speed NT, the AT oil temperature $T_{OIL}$, an upshift command $R_{UP}$, a downshift command $R_{DN}$, and the like, from the aforementioned sensors and switches. Also, the electronic control unit 90 receives a signal indicating whether the brake has been operated.

Figure 7:
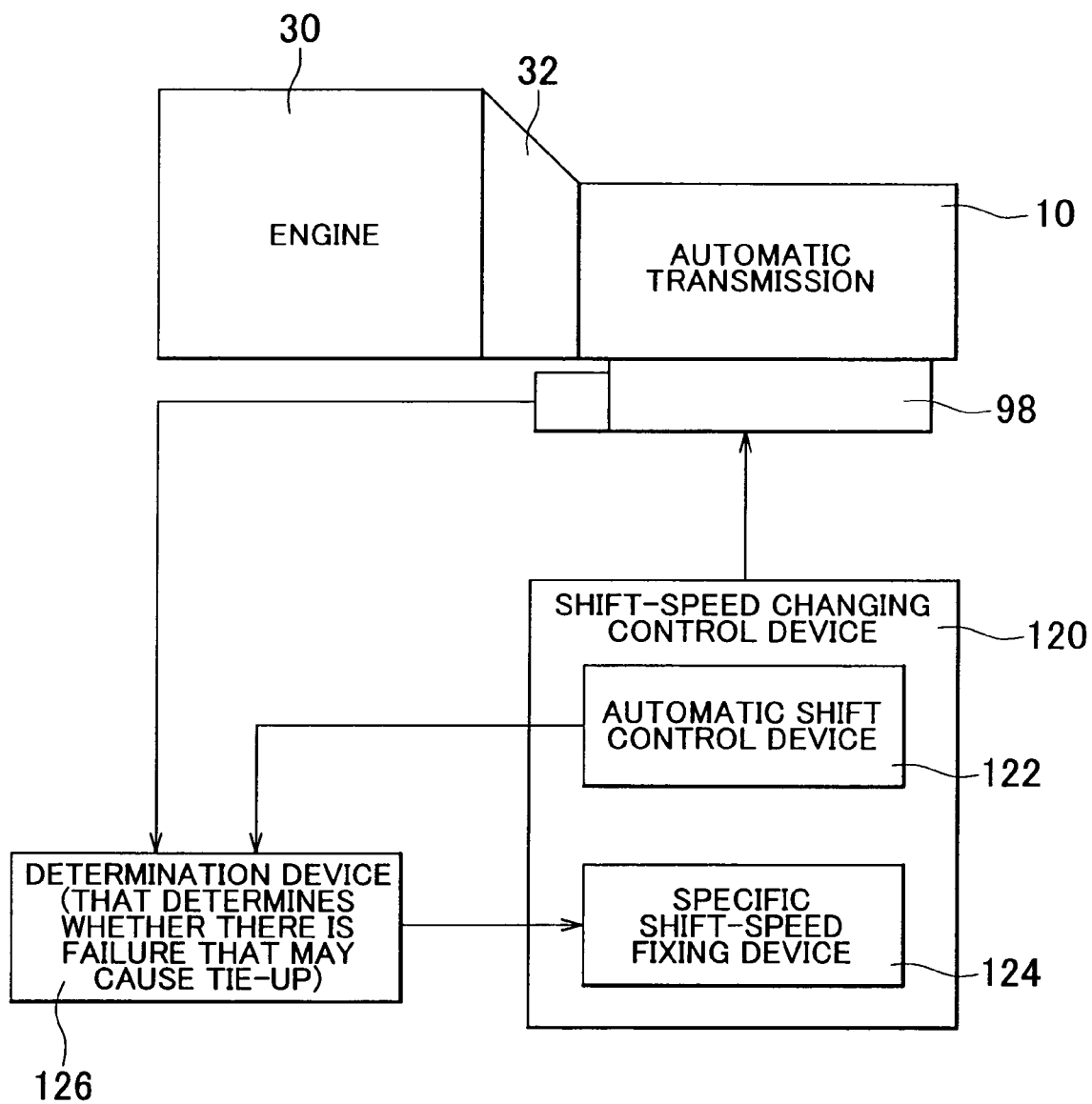
FIG. 7 is a functional block diagram showing the main control functions of an electronic control unit in FIG. 3.

The electronic control unit 90 is composed of a microcomputer that includes a CPU, RAM, ROM, and an input/output interface. The CPU executes signal processing according to programs that are stored in advance in the ROM using a temporary storage function of the RAM, thereby controlling the linear solenoid valves SL1 to SL6 and the electromagnetic valve MV1. Thus, the CPU executes an automatic shift control and a control for preventing tie-up. FIG. 7 is a functional block diagram showing the main control functions of the electronic control unit 90. In FIG. 7, a shift-speed changing control device 120 changes the shift speed of the automatic transmission 10. The shift-speed changing control device 120 includes an automatic shift control device 122 and a specific shift-speed fixing device 124.

Figure 8:
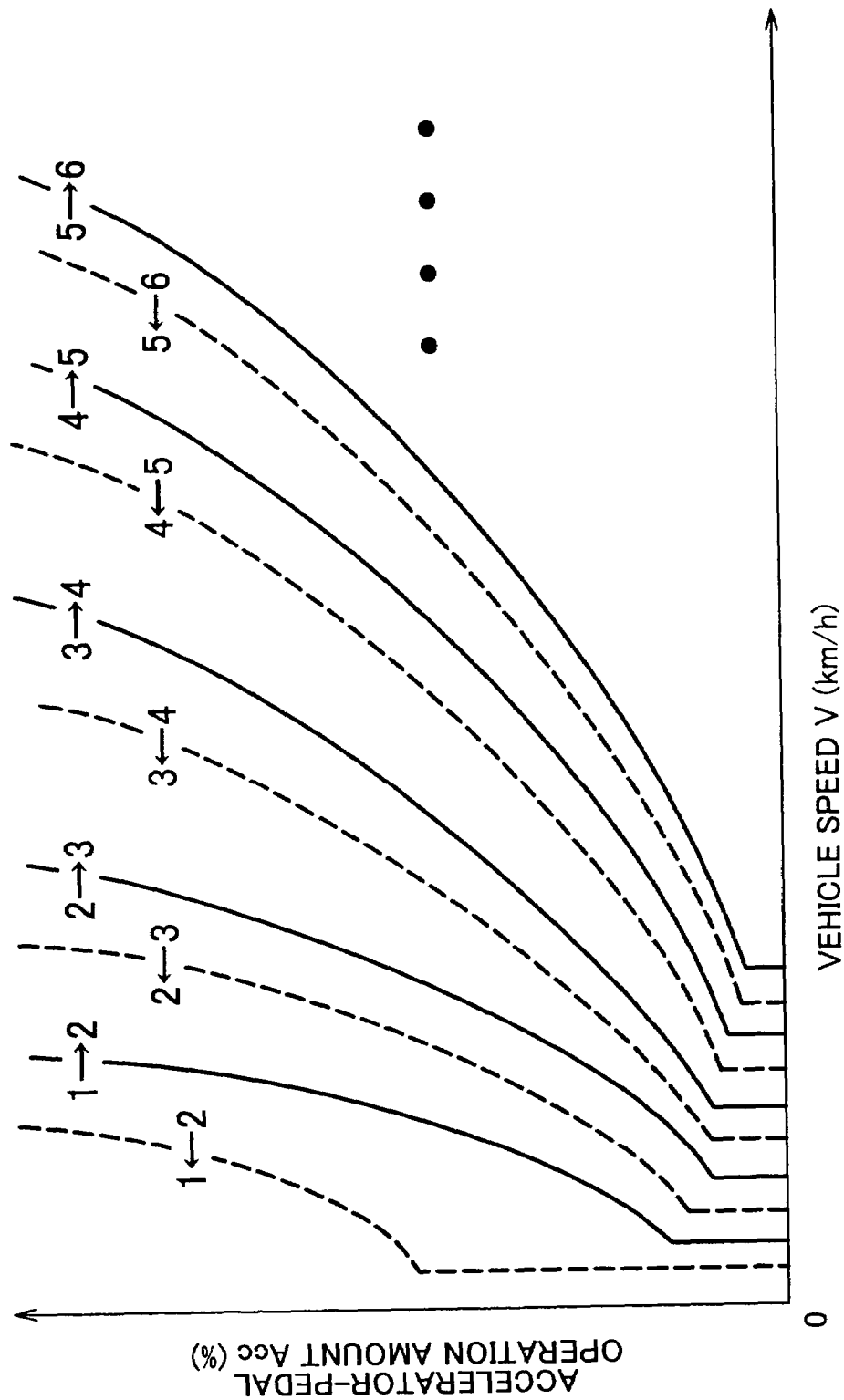
FIG. 8 is an example of a shift diagram used by an automatic shift control device in FIG. 7.

The automatic shift control device 122 determines the shift speed that should be achieved, based on the actual vehicle speed V and the accelerator-pedal operation amount Acc, according to, for example, a shift diagram in FIG. 8 stored in advance. The automatic shift control device 122 outputs a signal to achieve the determined shift speed, thereby controlling any two of the linear solenoid valves SL1 to SL6. As a result, any two of the clutches C1 to C4 and the brakes B1 and B2 are engaged.

For example, if at least one of the linear solenoid valves remains ON due to an electric failure or intrusion of foreign matter, that is, if at least one of the linear solenoid valves continues to output the hydraulic pressure, tie-up may occur in the automatic transmission 10. A determination device 126 determines whether there is such a failure that may cause tie-up in the automatic transmission 10, for example, by determining whether hydraulic pressure is generated in at least one hydraulic actuator in addition to two of the hydraulic actuators $A_{C1}$, $A_{C2}$, $A_{C3}$, $A_{C4}$, $A_{B1}$, and $A_{B2}$, which are selected based on the signals output from the automatic shift control device 122. For example, when the vehicle runs at the eighth speed, the determination device 126 determines whether the hydraulic pressure is generated in at least one hydraulic actuator for the brake or the clutch, in addition to the hydraulic actuator $A_{C2}$ for the clutch C2 and the hydraulic actuator $A_{B1}$ for the brake B1, based on the signals from the hydraulic switches $S_{C1}$, $S_{C2}$, $S_{C3}$, $S_{C4}$, $S_{B1}$, and $S_{B2}$.

If the determination device 126 determines that there is a failure that may cause tie-up in the automatic transmission 10, the specific shift-speed fixing device 124 turns the electromagnetic valve MV1 ON, and switches the state of the switching valve 36 from the non-failure state to the failure state, using the pilot pressure from the electromagnetic valve MV1. That is, in the switching valve 36, passages indicated by dashed lines are selected, instead of passages indicated by solid lines in FIG. 4. Thus, the line pressure PL is supplied, via the switching valve 36, to the drain ports 110 of the linear solenoid valves SL2 and SL3 corresponding to the clutches C2 and C3 that should be engaged when there is a failure. As a result, the clutches C2 and C3 are engaged. The atmospheric pressure is supplied, via the switching valve 36, to the input ports 106 of the linear solenoid valves SL1, SL4, and SL5 corresponding to the clutches C1 and C4 and the brake B1 that should be disengaged when there is a failure. As a result, the clutches C1 and C4 and the brake B1 are disengaged, regardless of the state of the linear solenoid valve SL5.

Thus, for example, if the state of the switching valve 36 is switched from the non-failure state to the failure state when the eighth speed is achieved by engaging the clutch C2 and the brake B1, the brake B1 is disengaged, and the clutch C3 is engaged in addition to the clutch C2. As described above, the clutches C1 and C4 and the brake B1 are disengaged when there is a failure. The clutches C2 and C3 are engaged when there is a failure. Therefore, in the automatic transmission 10, the seventh speed, which is lower than the eighth speed by one speed level, is achieved by engaging the clutches C2 and C3, instead of the eighth speed, and the shift speed is fixed at the seventh speed. That is, in the automatic transmission 10, the shift speed is changed from the eighth speed to the seventh speed, which is the specific shift speed that should be achieved when there is a failure.

The shift speed is changed to the seventh speed if any one or more of the linear solenoid valves SL1 to SL6 (corresponding to the clutches C1 to C4 and the brakes B1 and B2) remain ON, that is, if any one or more of the linear solenoid valves SL1 to SL6 continue to output the hydraulic pressure. For example, if the solenoid valve SL1 corresponding to the clutch C1 remains ON when the fifth speed is achieved by engaging the clutches C1 and C2, the state of the switching valve 36 is switched from the non-failure state to the failure state. Thus, the clutch C1 is disengaged while the clutch C2 is maintained in the engaged state. In addition, the clutch C3, which should be engaged when there is a failure, is engaged. As a result, in the automatic transmission 10, the shift speed is changed from the fifth speed to the seventh speed, and the shift speed is fixed at the seventh speed.

Figure 9:
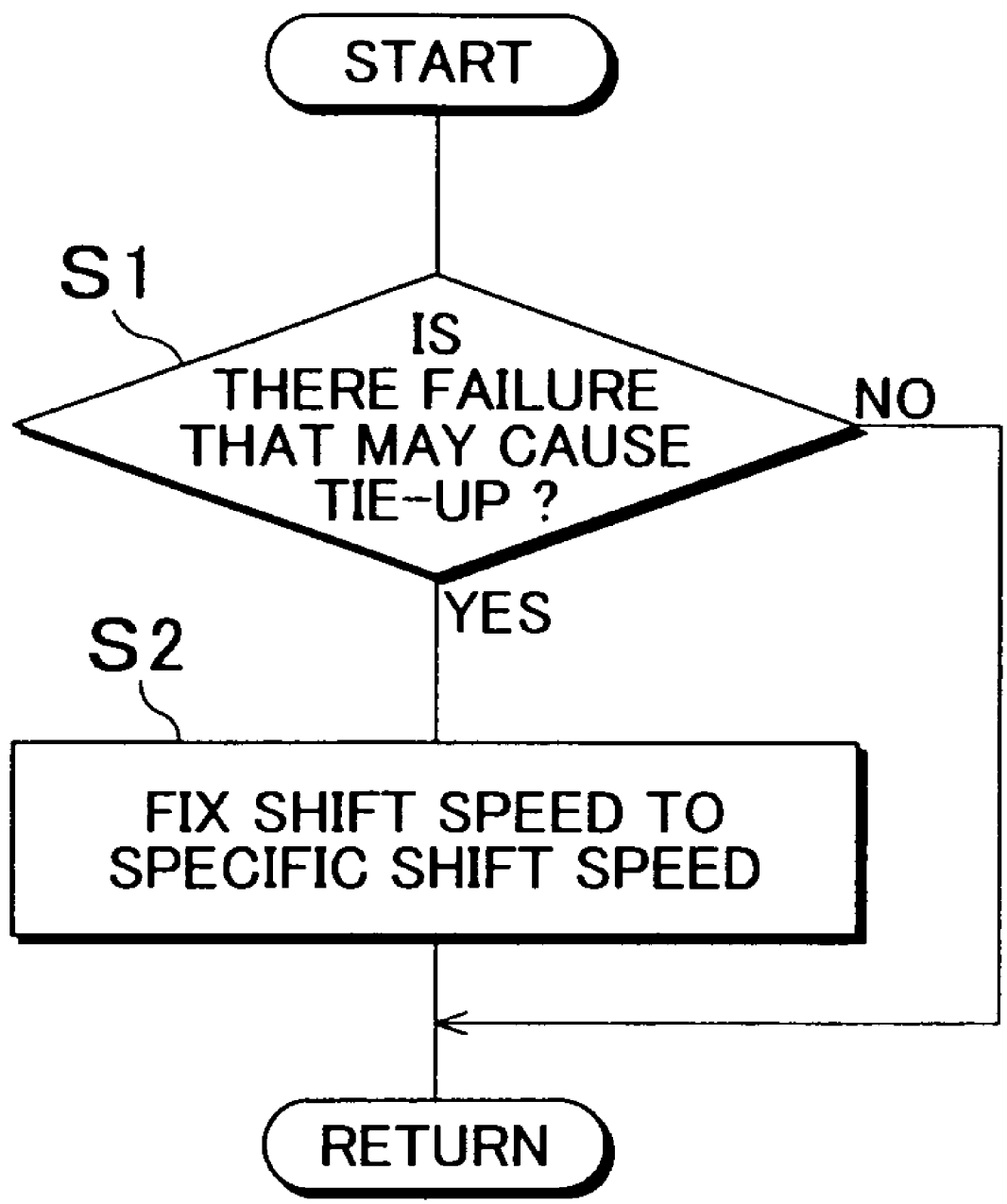
FIG. 9 is a flowchart showing the main control operation of the electronic control unit in FIG. 3.

FIG. 9 is a flowchart showing the main control operation of the electronic control unit 90. In FIG. 9, in step S1 corresponding to the determination device 126, it is determined whether there is a failure that may cause tie-up. If a negative determination is made in step S1, the routine is terminated. If an affirmative determination is made in step S1, in step S2 corresponding to the specific shift-speed fixing device 124, the electromagnetic valve MV1 is turned ON, and the state of the switching valve 36 is switched from the non-failure state to the failure state by the pilot pressure output from the electromagnetic valve MV1. As a result, the shift speed is changed to the specific shift speed in the automatic transmission 10.

As described above, in this embodiment, if it is determined that there is a failure that may cause tie-up in the automatic transmission 10, communication is provided between the first output port 38c and the first drain port 38a in the switching valve 36. As a result, the frictional engagement device among the plurality of the frictional engagement devices, which should be disengaged when there is a failure, are disengaged. Also, the seventh speed, which is the specific shift speed, is achieved by controlling the switching valve 36. Therefore, it is not necessary to select one of the shift speeds that are achieved on the condition that the hydraulic frictional engagement device corresponding to the failed linear solenoid valve is engaged. This prevents a shift that may impair driveability when there is a failure that may cause tie-up in the automatic transmission 10.

In this embodiment, the automatic transmission 10 includes the first hydraulic frictional engagement device (the clutch C1 in this embodiment). The first hydraulic frictional engagement device is engaged when the shift speed is lower than or equal to the predetermined shift (fifth speed in this embodiment), and is disengaged when the shift speed is higher than the predetermined shift speed. The hydraulic frictional engagement devices that are disengaged when there is a failure (C1, C4, and B1 in this embodiment) include the first hydraulic frictional engagement device (C1). Therefore, if the solenoid valve SL1 corresponding to the first frictional engagement device (C1) remains ON and continues to output the hydraulic pressure, the first hydraulic frictional engagement device (C1) is disengaged by the switching valve 36, and the specific shift speed (the seventh speed in this embodiment) is achieved. Thus, it is not necessary to select one of the shift speeds that are achieved on the condition that the first hydraulic frictional engagement device (C1) corresponding to the failed solenoid valve SL1 is engaged. For example, if the solenoid valve SL1 corresponding to the clutch C1, which is engaged to achieve the first to fifth speeds, remains ON and continues to output the hydraulic pressure when the vehicle runs at the eighth speed, the seventh speed, which is the specific shift speed, is achieved. Therefore, it is possible to prevent a drastic downshift from the eighth speed to one of the first to fifth speeds that are achieved on the condition that the clutch C1 is engaged. This prevents a shift that may impair driveability when there is a failure in the solenoid valve.

In this embodiment, the specific shift speed is the seventh speed that is lower than the highest shift speed of the automatic transmission 10 by one speed level. Therefore, if there is a failure that may cause tie-up when the vehicle runs at a relatively high shift speed, the seventh speed, which is lower than the highest shift speed by one speed level, is achieved. Therefore, it is possible to prevent a drastic downshift. This prevents the driver from feeling uncomfortable, and suppresses a decrease in the driving force.

In this embodiment, the second output port 40c of the switching valve 36 is connected to the drain ports 110 of the solenoid valves SL2 and SL3 corresponding to the hydraulic frictional engagement devices (C2 and C3) that are engaged when there is a failure. When there is no failure, communication is provided between the second output port 40c and the second drain port 40b. When there is a failure, communication is provided between the second output port 40c and the second input port 40a. Therefore, when there is no failure, the solenoid valves SL2 and SL3 corresponding to the hydraulic frictional engagement devices (C2 and C3) operate normally, because the hydraulic oil is drained from the drain ports 110 of the solenoid valves SL2 and SL3 through the switching valve 36. When there is a failure, the drain ports 110 of the solenoid valves SL2 and SL3 are closed by the switching valve 36. As a result, the hydraulic frictional engagement devices (C2 and C3), which are engaged by the hydraulic pressure output from the solenoid valves SL2 and SL3, are maintained in the engaged state. Thus, the specific shift speed can be achieved without controlling the plurality of solenoid valves individually.

In this embodiment, when there is a failure, the hydraulic frictional engagement device (C3) is engaged to achieve the specific shift speed that is lower than the highest shift speed of the automatic transmission 10 by one speed level. Therefore, it is possible to prevent a drastic downshift. This prevents the driver from feeling uncomfortable, and suppresses a decrease in the driving force.

In this embodiment, the electronic control unit 90 determines whether there is a failure that may cause tie-up in the automatic transmission 10. If the electronic control unit 90 determines that there is a failure that may cause tie-up, the state of the switching valve 36 is switched. As a result, the hydraulic frictional engagement devices (C1, C4, and B1) among the plurality of hydraulic frictional engagement devices, which should be disengaged when there is a failure, are disengaged. Also, the specific shift speed is achieved by controlling the switching valve 36. Because the state of the switching valve 36 is switched by electric processing, the configuration of the hydraulic control circuit 98 can be simplified, as compared to the case where a conventional fail-safe valve is employed. The state of the conventional fail-safe valve is mechanically switched using the engagement pressure for a plurality of hydraulic frictional engagement devices.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A hydraulic control apparatus for a vehicular automatic transmission in which a plurality of shift speeds having different speed ratios are achieved by selectively engaging and disengaging a plurality of hydraulic frictional engagement devices, the hydraulic control apparatus comprising:

a plurality of solenoid valves which respectively correspond to respective hydraulic frictional engagement devices of the plurality of hydraulic frictional engagement devices, which output hydraulic pressure directly to the respective hydraulic frictional engagement devices, and which are controlled to achieve any one of a plurality of shift speeds; and a switching valve device which includes a first output port connected to an input port of a first solenoid valve among the plurality of solenoid valves, wherein the first solenoid valve corresponds to a hydraulic frictional engagement device among the plurality of hydraulic frictional engagement devices, and wherein the first solenoid valve is disengaged when there is a failure that may cause tie-up in the automatic transmission, a first input port to which an original pressure is supplied, a first drain port, wherein when there is no failure that may cause tie-up in the automatic transmission, communication is provided between the first output port and the first input port, and wherein when there is a failure that may cause tie-up, communication is provided between the first output port and the first drain port to achieve a specific shift speed, a second output port connected to a drain port of a second solenoid valve among the plurality of solenoid valves, wherein the second solenoid valve corresponds to a hydraulic frictional engagement device among the plurality of hydraulic frictional engagement devices, and wherein the second solenoid valve is engaged when there is a failure that may cause tie-up, a second input port to which the original pressure is supplied, and a second drain port, wherein when there is no failure that may cause tie-up in the automatic transmission, communication is provided between the second output port and the second drain port, and wherein when there is a failure that may cause tie-up, communication is provided between the second output port and the second input port, wherein the plurality of hydraulic frictional engagement devices include a first hydraulic frictional engagement device that is engaged when a shift speed of the automatic transmission is lower than or equal to a predetermined shift speed, and is disengaged when the shift speed is higher than the predetermined shift speed, and wherein the hydraulic frictional engagement device that is disengaged when there is a failure that may cause tie-up includes the first hydraulic frictional engagement device.

2. The hydraulic control apparatus according to claim 1, wherein the specific shift speed is lower than a highest shift speed of the automatic transmission by one speed level.

3. The hydraulic control apparatus according to claim 1, wherein the switching valve device includes an electromagnetic valve that outputs a hydraulic signal and stops outputting the hydraulic signal according to an electric signal; and a switching valve that selects among passages through which the hydraulic pressure is supplied to the plurality of solenoid valves, according to the hydraulic signal output from the electromagnetic valve.

4. The hydraulic control apparatus according to 1, wherein the hydraulic frictional engagement device that is engaged when there is a failure that may cause tie-up is a hydraulic frictional engagement device that is engaged to achieve a shift speed that is lower than a highest shift speed of the automatic transmission by one speed level.

5. The hydraulic control apparatus according to claim 1,
wherein the hydraulic control apparatus further includes a control device that electrically controls the switching valve device, and the control device determines whether there is a failure that may cause tie-up in the automatic transmission, and wherein if the control device determines that there is a failure that may cause tie-up, the control device controls the switching valve device to provide communication between the first output port and the first drain port, and if the control device determines that there is no failure, the control device controls the switching valve device to provide communication between the first output port and the first input port.

6. The hydraulic control apparatus according to claim 3, wherein the hydraulic signal output by the electromagnetic valve is supplied to the electromagnetic valve by a modulator valve that generates a modulator pressure by regulating the original pressure to a constant value.

7. The hydraulic control apparatus according to claim 6, wherein the modulator valve includes a modulator input port, a modulator output port, a modulator drain port, and a spring, wherein the original pressure is supplied to the modulator input port, wherein the modulator output port is connected to the electromagnetic valve, and wherein the spring of the modulator valve regulates the original pressure down to the modulator pressure based on a load of the spring such that the modulator pressure is a constant value regardless of a change in the original pressure.

\* \* \* \* \*